United States Patent
Doyle (10) Patent No.: US 8,195,649 B2
(45) Date of Patent: Jun. 5, 2012

(54) APPARATUS, SYSTEM, AND METHOD FOR ACCESSING A DATABASE

(75) Inventor: Brian Paul Doyle, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 1376 days.

(21) Appl. No.: 11/268,844

(22) Filed: Nov. 8, 2005

(65) Prior Publication Data

US 2007/0106652 A1    May 10, 2007

(51) Int. Cl.
*G06F 7/00* (2006.01)
*G06F 17/30* (2006.01)
(52) U.S. Cl. ........................... 707/722; 707/760
(58) Field of Classification Search ............... 707/4, 705, 707/722, 758, 759, 760, 762, 763
See application file for complete search history.

(56) References Cited

U.S. PATENT DOCUMENTS

| | | | |
|---|---|---|---|
| 4,439,837 A * | 3/1984 | Aiena et al. | 711/117 |
| 5,555,403 A * | 9/1996 | Cambot et al. | 707/4 |
| 5,778,373 A | 7/1998 | Levy et al. | |
| 5,956,698 A | 9/1999 | Lacheze et al. | 705/34 |
| 6,598,087 B1 | 7/2003 | Dixon, III et al. | 709/236 |
| 6,694,321 B1 | 2/2004 | Berno | |
| 6,738,155 B1 | 5/2004 | Rosenlund et al. | 358/1.15 |
| 6,832,219 B2 * | 12/2004 | Lal | 707/3 |
| 2003/0140315 A1 | 7/2003 | Blumberg et al. | 715/527 |
| 2003/0182137 A1 | 9/2003 | Whitmarsh et al. | 705/1 |
| 2003/0187733 A1 | 10/2003 | Hertling et al. | 705/14 |
| 2003/0191829 A1 | 10/2003 | Masters et al. | 709/223 |
| 2004/0008365 A1 | 1/2004 | Hobbs | 358/1.15 |
| 2004/0030649 A1 | 2/2004 | Nelson et al. | 705/44 |
| 2004/0039647 A1 | 2/2004 | Roche | 705/26 |
| 2004/0061729 A1 | 4/2004 | Green et al. | 347/5 |
| 2004/0111418 A1 | 6/2004 | Nguyen et al. | 707/100 |
| 2005/0171833 A1 * | 8/2005 | Jost et al. | 705/10 |

OTHER PUBLICATIONS

Microsoft SQL Server 2000 Enterprise Edition, http://www.microsoft.com/sql, Product Information Sheet, 2000, 4 pp.*
MSDN Testing and Debugging in the Workflow Designer for SQL Server, http://msdn2.microsoft.com/en-us/library/aa140521/(office.10,d=printer).aspx, 2001, 1 pp.*

* cited by examiner

*Primary Examiner* — Marc Somers
(74) *Attorney, Agent, or Firm* — Kunzler Needham Massey & Thorpe (57) ABSTRACT

An apparatus, system, and method are disclosed for accessing a database. A request attribute module constructs a request attribute list from an attribute database for a data value name received in a request block, wherein the request block is an inquiry to a target database and is not formatted as a query statement for the target database. The request attribute list associates the data value name with an attribute name and a schema name. A schema name module adds the schema name from the request attribute list to a schema names list in response to the schema name not being included in the schema names list. An attribute name module adds the attribute name from the request attribute list to an attribute names list in response to the attribute name not being included in the attribute names list. A query module builds a query statement directed to the target database from the schema names list and the attribute names list.

19 Claims, 10 Drawing Sheets

| DBAMain.Master.Surname 902a | Last 905a | DBAMain 910a | ACCT_Master 915a | Account 920a |
| DBAMain.Master.Balance 902b | Bal 905b | DBAName 910b | ACCT_Master 915b | Account 920b |
| DBAMain.Detail.City 902c | City 905c | DBAMain 910c | ACCT_Detail 915c | Account 920c |

APPARATUS, SYSTEM, AND METHOD FOR ACCESSING A DATABASE

BACKGROUND OF THE INVENTION

1. Field of the Invention

This invention relates to accessing a target database and more particularly relates to accessing the target database with an inquiry that is not formatted as a database query statement.

2. Description of the Related Art

Databases are used to store large amounts of information for organizations and individuals. For example, a commercial database may store the customer records for a plurality of customers of an organization, as well as a plurality of transactions relating to each customer. The typical database is organized using plurality of schema. For example, the database may be organized as one or more tables, with one or more table views. In addition, the tables and views may comprise one or more columns or attributes and one or more rows as is well known to those skilled in the art. The schema of the database may comprise tables, views, and the like.

A user of the database data often desires to access only a subset of the database data. In addition the user may desire to organize the accessed subset in a convenient organization targeting selected information, although the convenient organization may be very differently from the database. The user will typically employ a query statement to direct a database application to access and organize the target database data. The query statement may specify the subset of data to be accessed, operations to perform on the accessed data, and/or an output organization for the accessed data. An example of a query statement is a structured query language ("SQL") statement. Variations of the SQL statements are used by a number of database applications including the DB2™ Product Family from INTERNATIONAL BUSINESS MACHINES® Corporation ("IBM") of Armonk, N.Y.

The query statement may be communicated directly to a database application or incorporated in a process that is used to access the database. For example, a user at utility company print bills for utility customers from a database by executing a bill printing process. The bill printing process may use one or more SQL statements to access data for current customers and past customers with an outstanding balance, calculate current balances, and print each customer's name, address, account number, and balance in an easily readable organization.

Unfortunately, in addition to database applications, many additional software applications may also require access to a target database. For example, it may be desirable for software applications written in C, C++, Java, Cobol, and the like, and/or communication formats such as extensible mark language ("XML") and hypertext markup language ("HTML") to access the target database. Yet these software applications and requests may be unable to easily create the query statements required for access to the target database.

From the foregoing discussion, it should be apparent that a need exists for an apparatus, system, and method that access a target database using a request that is not formatted as a target database query statement. Beneficially, such an apparatus, system, and method would allow a plurality of software applications and communication formats to access the target database.

SUMMARY OF THE INVENTION

The present invention has been developed in response to the present state of the art, and in particular, in response to the problems and needs in the art that have not yet been fully solved by currently available database access methods. Accordingly, the present invention has been developed to provide an apparatus, system, and method for accessing a database that overcome many or all of the above-discussed shortcomings in the art.

The apparatus to access a database is provided with a plurality of modules configured to functionally execute the necessary steps of constructing a request attribute list, adding a schema and/or table name to a schema names list, adding an attribute name to an attribute names list, and building a query statement from the schema names list and the attribute names list. These modules in the described embodiments include a request attribute module, a schema name module, an attribute name module, and a query build module. In addition, the apparatus may include a query execution module and a translation module.

A request block is configured as an inquiry to a target database. The request block includes a data value name and is not formatted as a query statement for the target database. The request attribute module constructs a request attribute list for the data value name. In one embodiment, the request attribute module constructs the request attribute list using an attribute database. The request attribute list associates the data value name with an attribute name and a schema name from the attribute database.

A schema name module adds the schema name from the request attribute list to a schema names list in response to the schema name not being included in the schema names list. In addition, an attribute name module adds the attribute name from the request attribute list to an attribute names list in response to the attribute name not being included in the attribute names list.

The query build module builds a query statement directed to the target database from the schema names list and the attribute names list. In one embodiment, the query statement is an SQL statement. In a certain embodiment, the query build module builds the SQL statement as a SELECT statement that employs the attribute name and the schema name.

In one embodiment, the query execution module executes the query statement. The query execution module may submit the query statement to a database application for the target database. In addition, the translation module may translate a result from executing the query statement to a format specified by the request block. The application accesses the target database in response to an inquiry embodied by the request block although the request block is not formatted as a query statement.

A system of the present invention is also presented to access a database. The system may be embodied in a database system. In particular, the system, in one embodiment, includes a target database, an attribute database, a request attribute module, a schema name module, an attribute name module, a query build module, and a query execution module.

The database stores data with an organization defined by a schema and table. For example, the database may be organized as one or more tables accessible as one or more views. Each table may be organized as a plurality of attributes or columns and rows.

The attribute database associates a data value name with an attribute name and schema name. For example, the attribute database may associate a data value name "surname" with an attribute name "last_name" in a table with a schema name "customers."

A software application may communicate a request block to the system. The request attribute module constructs a request attribute list from the attribute database for a data value name received in the request block, wherein the request block is an inquiry to the target database and is not formatted as a query statement for the target database. The schema name module adds a schema name from the request attribute list to a schema names list in response to the schema name not being included in the schema names list. The attribute name module adds the attribute name from the request attribute list to an attribute names list in response to the attribute name not being included in the attribute names list.

The query module builds a query statement directed to the target database from the schema names list and the attribute names list. The execution module executes the query statement, accessing the target database. The system creates and executes a query statement in response to the request block, allowing the software application to access the database.

A method of the present invention is also presented for accessing a database. The method in the disclosed embodiments substantially includes the steps necessary to carry out the functions presented above with respect to the operation of the described apparatus and system. In one embodiment, the method includes constructing a request attribute list, adding a schema name to a schema names list, adding an attribute name to an attribute names list, and building a query statement from the schema names list and the attribute names list.

A request attribute module constructs a request attribute list from an attribute database for a data value name received in a request block, wherein the request block is an inquiry to a target database and is not formatted as a query statement for the target database. The request attribute list associates the data value name with an attribute name and a schema name from an attribute database. A schema name module adds the schema name from the request attribute list to a schema names list in response to the schema name not being included in the schema names list. An attribute name module adds the attribute name from the request attribute list to an attribute names list in response to the attribute name not being included in the attribute names list. A query module builds a query statement directed to the target database from the schema names list and the attribute names list. The method accesses the target database.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention accesses a target database in response to a request block that is not formatted as a database query statement. In addition, the embodiment of the present invention allows a plurality of non-database software applications to access the target database. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
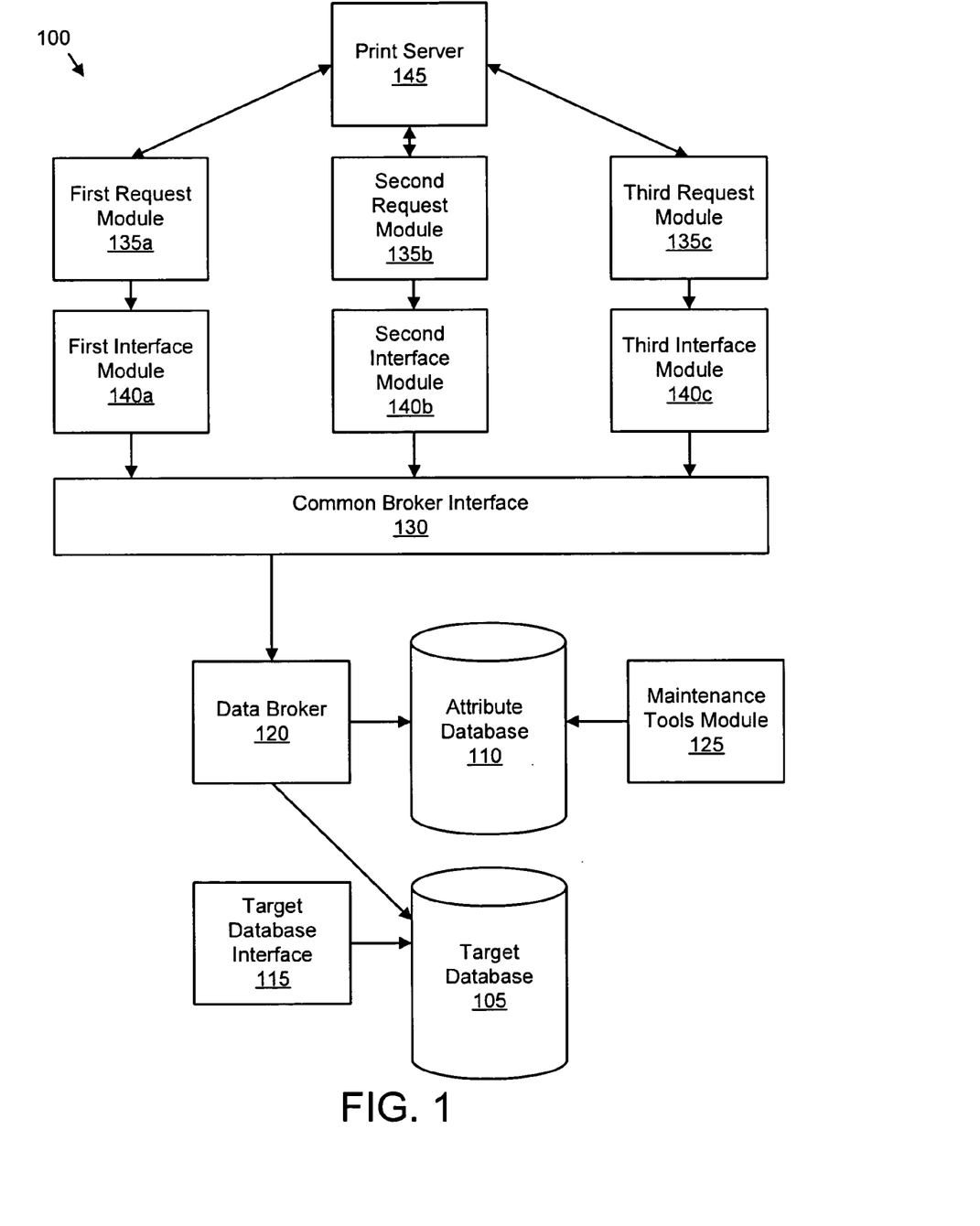
FIG. 1 is a schematic block diagram illustrating one embodiment of a database system of the present invention.

FIG. 1 is a schematic block diagram illustrating one embodiment of a database system 100 of the present invention. The system 100 includes a target database 105, attribute database 110, a target database interface 115, a data broker 120, a maintenance tools module 125, a common broker interface 130, one or more request modules 135, one or more interface modules 140, and a print server 145.

The target database 105 comprises data organized using one or more schema such as tables, views, attributes or columns, rows, and keys as is well known to those skilled in the art. For example, the target database 105 may be organized with one or more tables. Each table may be associated with one or more views. In addition, each table may comprise one or more attributes or columns and one or more rows. A specified row may include a key that identifies the row.

The target database 105 is accessed using the target database interface 115. The target database interface 115 may be a database application such as DB2™ Database Software from IBM, ORACLE® DATABASE™ from ORACLE® Corporation of Redwood Shores, Calif., or SQL SERVER™ from MICROSOFT® Corporation of Redmond Wash.

Although the target database interface 115 supports access to the target database 105, the request modules 135 may be unable to access the target database 105 through the target database interface 115. For example, a first request module 135a may be a software program written in the programming language C++. The first request module 135a may not be readily or easily adapted to access data from the target database 105 through the target database interface 115. In addition, the third request module 135c may be an XML request that is not adapted to access the target database 115. The system 100 supports a plurality of software applications and communication formats accessing the target database 105.

The attribute database 110 associates a data value name with an attribute name and a schema and/or table name of the target database 105. The data value name may be used by the request modules 135 to access the target database 105. In one embodiment, the data value name may be associated with an attribute name for the target database 105. In a certain embodiment, the attribute name may be in a hierarchal format that differs from the format of the attribute name. A request module 135 such as the first request module 135a may communicate an inquiry that includes the data value name to a first interface module 140a. The first interface module 140a may convert the inquiry into a common inquiry format that includes the data value name. The common broker interface 130 may convert the common inquiry format inquiry into a request block and communicate the request block to the data broker 120.

For example, the first request module 135a configured as a C++ software program may communicate an inquiry formatted with a header character string and one or more requests organized as delimited character strings. A request character string may include the data value name "customer_city" and a key value "4719 2699 3288 4218" wherein the key value is an account number. The first interface module 140a may convert the inquiry to a linked array of data arrays with data array for each request character string. Each data array may include one or more data fields. The first interface module 140a may copy the data value name "customer_city" into a first data field and the key value "4719 2699 3288 4218" into a second data field. The common broker interface 130 may further format the linked data array as the request block and communicate the request block to the data broker 120.

The data broker 120 uses the request block to access the target database 105 in a manner that will be discussed hereafter. In addition, the data broker 120 may receive results of the target database access and communicate the results to the common broker interface 130. The common interface broker may communicate the results through an interface module 140 to a request module 135.

In one embodiment, the request modules 135 access the target database 105 through the data broker 120 for print process data. For example, the first request module 135a may print a customer bill to the print server 145 and access the target database 105 to retrieve data required for the customer bill print job.

The maintenance tools module 125 maintains the attribute database 110. For example, a user may employ the maintenance tools module 125 to add an entry comprising a data value name, an associated attribute name, and one or more associated schema and/or table names to the attribute database 110. In addition, the user may employ the maintenance module 125 to remove or modify an entry to the attribute database 110.

Figure 2:
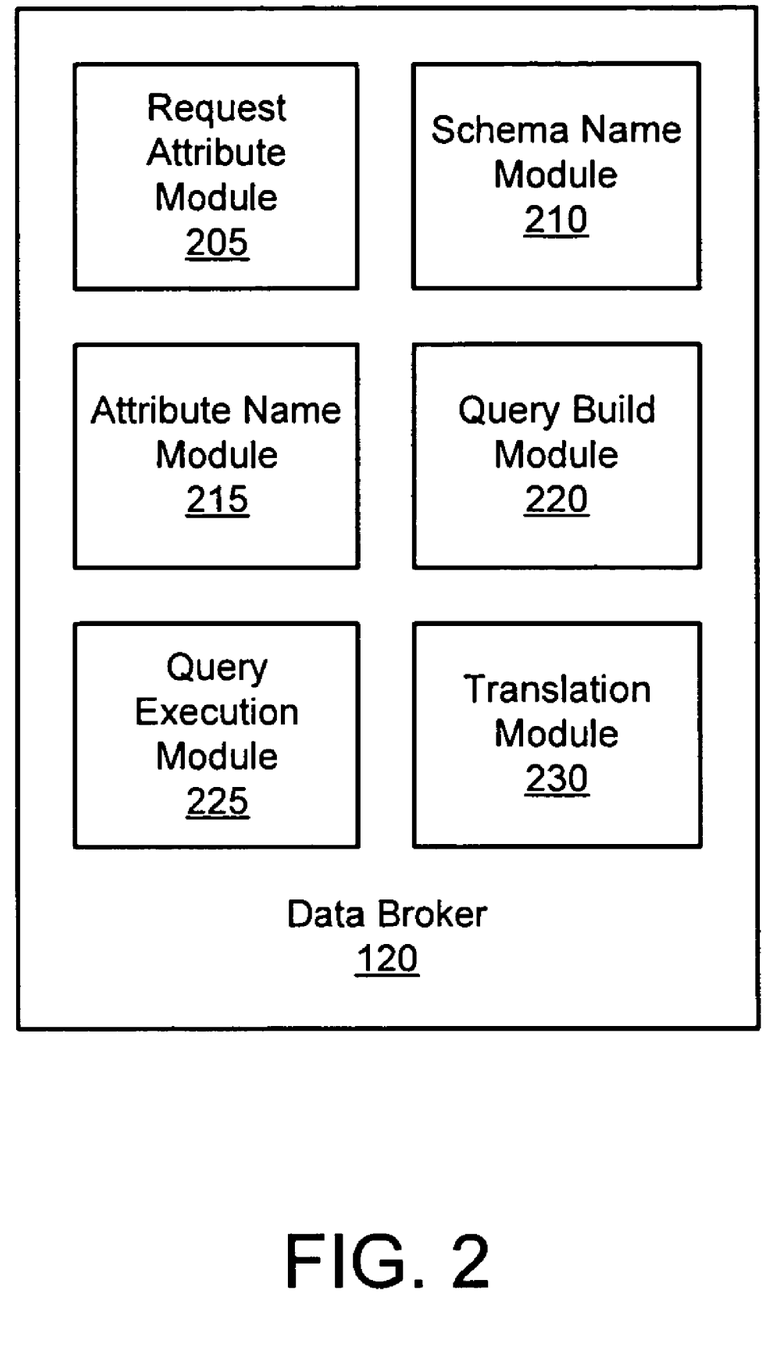
FIG. 2 is a schematic block diagram illustrating one embodiment of a data broker of the present invention.

FIG. 2 is a schematic block diagram illustrating one embodiment of a data broker 120 of the present invention. The data broker 120 is the data broker of FIG. 1. In addition, the description of the data broker 120 refers to elements of FIG. 1, like numbers referring to like elements. The embodiment of the data broker 120 includes a request attribute module 205, schema name module 210, attribute name module 215, query build module 220, query execution module 225, and translation module 230.

The request attribute module 205 receives a request block comprising a data value name. In one embodiment, the request block comprises a plurality of data value names. The request attribute module 205 may receive the request block from the common broker interface 130 of FIG. 1. The request attribute module 205 constructs a request attribute list for the one or more data value names of the request block. In one embodiment, the request attribute module 205 constructs the request attribute list using the attribute database 110 of FIG. 1.

In one embodiment, the request attribute list comprises a data value name with an associated attribute name and one or more schema and/or table names. For example, the data value name "customer_city" and the key value "4719 2699 3288 4218" discussed as an example for FIG. 1 may be associated with an attribute name "city" and a table name "customers." The request list may be configured as a delimited flat file, a linked array of data arrays, or the like.

A schema name module 210 adds a schema name from the request attribute list to a schema names list in response to the schema name not being included in the schema names list. The schema names list includes one or more schema names such as a table name required to access data relating to the data value name from the target database 105. The schema name module 210 prevents multiple instances of a schema name from being included in the schema names list.

The attribute name module 215 adds the attribute name to an attribute names list in response to the attribute name not being included in the attribute names list. The attribute names list includes one or more attribute names required to access the data relating the data value name from the target database 105. The attribute name module 215 prevents multiple instances of an attribute name from being included in the attribute names list.

The query build module 220 builds a query statement directed to the target database 105 from the schema names list and the attribute names list. In one embodiment, the query statement is an SQL statement. In a certain embodiment, the query build module 220 builds the SQL statement as a SELECT statement that employs the attribute name and the schema name as will be discussed hereafter.

In one embodiment, the query execution module 225 executes the query statement. The query execution module may submit the query statement to a database application for the target database 105 such as the database interface module 115 of FIG. 1. In addition, the translation module 230 may translate a result from executing the query statement to a format specified by the request block as will be described hereafter. The data broker 120 accesses the target database 105 in response to an inquiry embodied by the request block although the request block is not formatted as a query statement.

Figure 3:
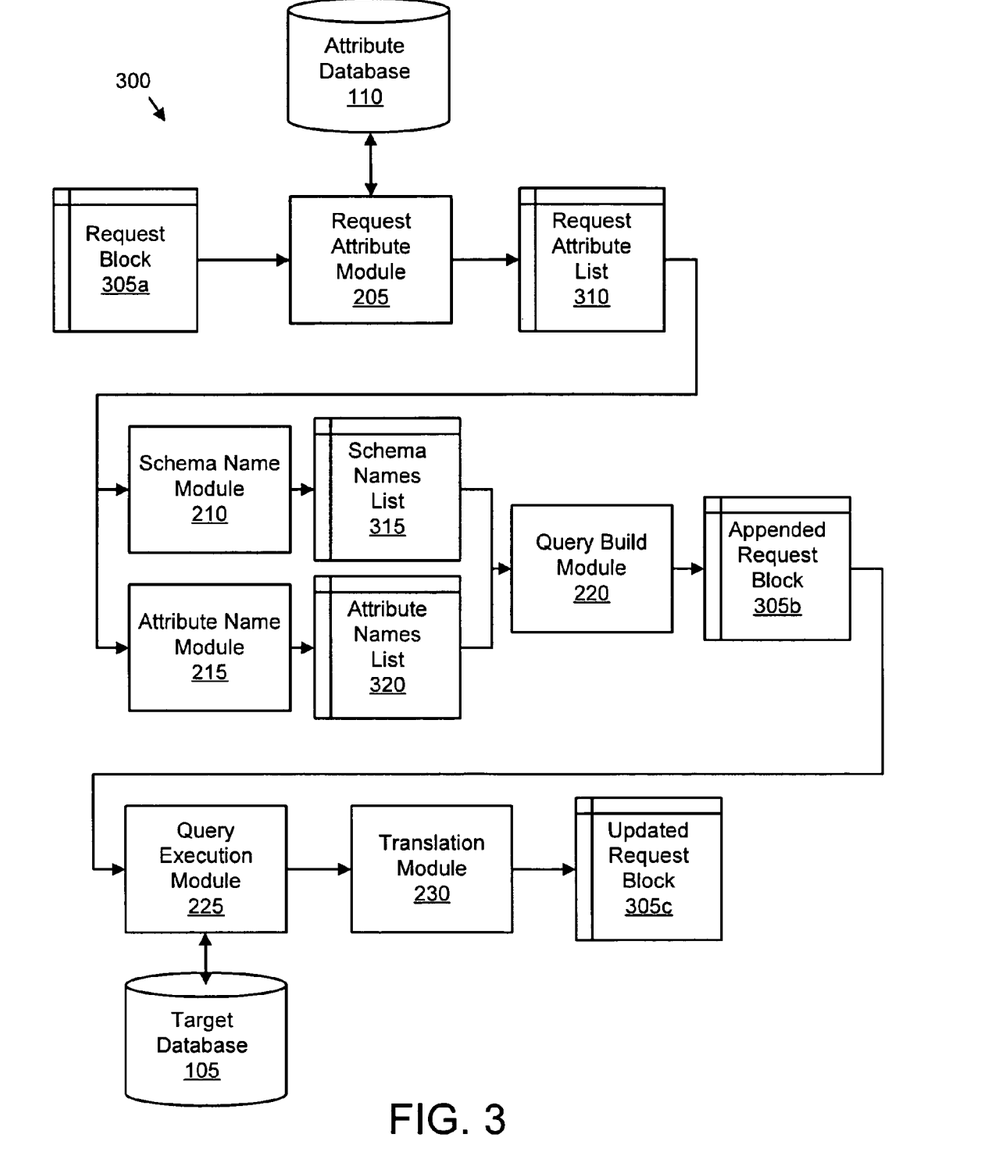
FIG. 3 is a schematic block diagram illustrating one embodiment of a database access process of the present invention.

FIG. 3 is a schematic block diagram illustrating one embodiment of a database access process 300 of the present invention. The process 300 describes one embodiment of data flow through the system 100 of FIG. 1 and the data broker 120 of FIG. 2. Elements of FIGS. 1 and 2 are referenced, like numbers referring to like elements.

The request attribute module 205 receives a request block 305a. The request block 305a includes a data value name. In addition, the request block 305a may include a specified format for a result returned in response a query statement. The request attribute module 205 constructs a request attribute list 310. The schema name module 210 adds a schema name from the request attribute list 310 to a schema names list 315 if the schema name is not included in the schema names list 315 while the attribute name module 215 adds an attribute name to an attribute names list 320 if the attribute name is not included in the attribute names list 320.

The query build module 220 builds a query statement directed to the target database 105 from the schema names list 315 and attribute names list 320. In addition, the query build module 220 may append the query statement to the request block 305a to form an appended request block 305b.

In one embodiment, the query execution module 225 executes the query statement appended to the appended request block 305b. The query execution module 225 may direct the query statement from the appended request block 305b to the target database 105. In addition, the translation module 230 may receive a result from the target database 105 in response to the query statement. For example, a query statement comprising the attribute name "city" from the example of FIG. 2 may return the result "Tucson."

The translation module 230 may translate the result to the format specified by the request block 305a and included in the appended request block 305b. For example, the translation module 230 may translate a character string representation of a numerical value to a digital binary value in response to the specified format. In one embodiment, the translation module 230 updates the appended request block 305b with the results such as the translated results to form an updated request block 305c.

Figure 4:
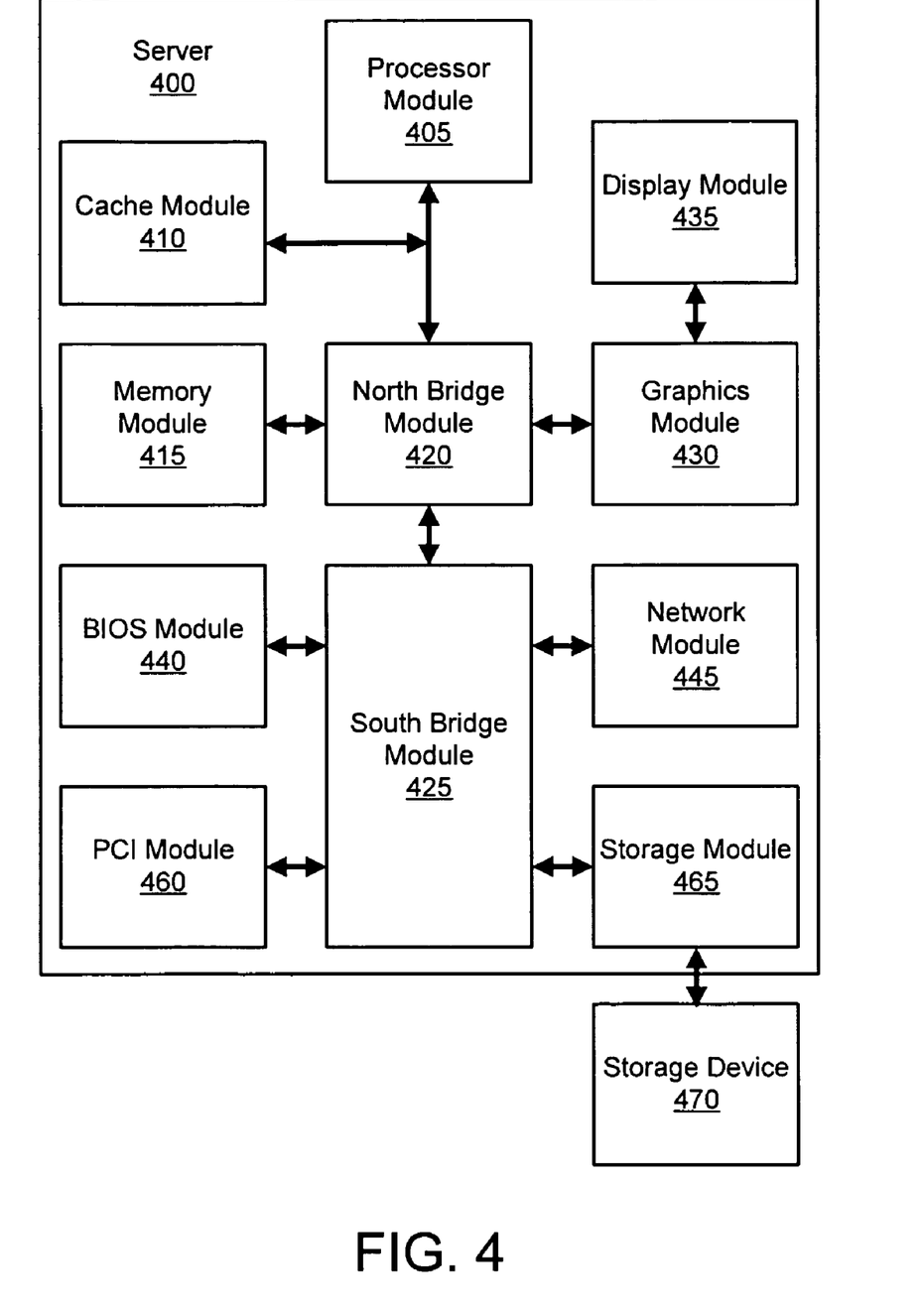
FIG. 4 is a schematic block diagram illustrating one embodiment of a server in accordance with the present invention.

FIG. 4 is a schematic block diagram illustrating one embodiment of a server 400 in accordance with the present invention. The server 400 includes a processor module 405, a cache module 410, a memory module 415, a north bridge module 420, a south bridge module 425, a graphics module 430, a display module 435, a basic input/output system ("BIOS") module 440, a network module 445, a peripheral component interconnect ("PCI") module 460, and a storage module 465. In addition, the server 400 is depicted in communication with a storage device 470. The storage device 470 may be a hard disk drive, a storage subsystem, or the like. Elements of FIGS. 1-3 are referenced, like numbers referring to like elements.

The processor module 405, cache module 410, memory module 415, north bridge module 420, south bridge module 425, graphics module 430, display module 435, BIOS module 440, network module 445, PCI module 460, and storage module 465, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate to substrate wiring, circuit card traces, or wires connecting the semiconductor devices.

The memory module 415 stores software instructions and data. The processor module 405 executes the software instructions and manipulates the data as is well know to those skilled in the art. In one embodiment, the memory module 415 stores and the processor module 405 executes one or more software processes embodying the request attribute module 205, schema name module 210, attribute name module 215, query build module 220, query execution module 225, and translation module 230 of FIG. 2. The software processes may further embody the target database interface 115, maintenance tools module 125, common broker interface 130, interface modules 140, and request modules 135 of FIG. 1. In an alternate embodiment, the target database interface 115, maintenance tools module 125, common broker interface 130, interface modules 140, and request modules 135 communicate with software processing embodying the request attribute module 205, schema name module 210, attribute name module 215, query build module 220, query execution module 225, maintenance module 230, and translation module 230 through the network module 445.

In one embodiment, the software processes communicate with the print server 145 of FIG. 1 through the network module 445. The network module 445 may be configured as an Ethernet interface of the like. The attribute database 110 may be stored on the storage device 470 and accessed through the storage module 465. In addition, the target database 105 may be stored on the storage device 470 and accessed through the storage module 465. Alternatively, the software processes may communicate with the attribute database 110 and the target database 105 through the network module 445.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
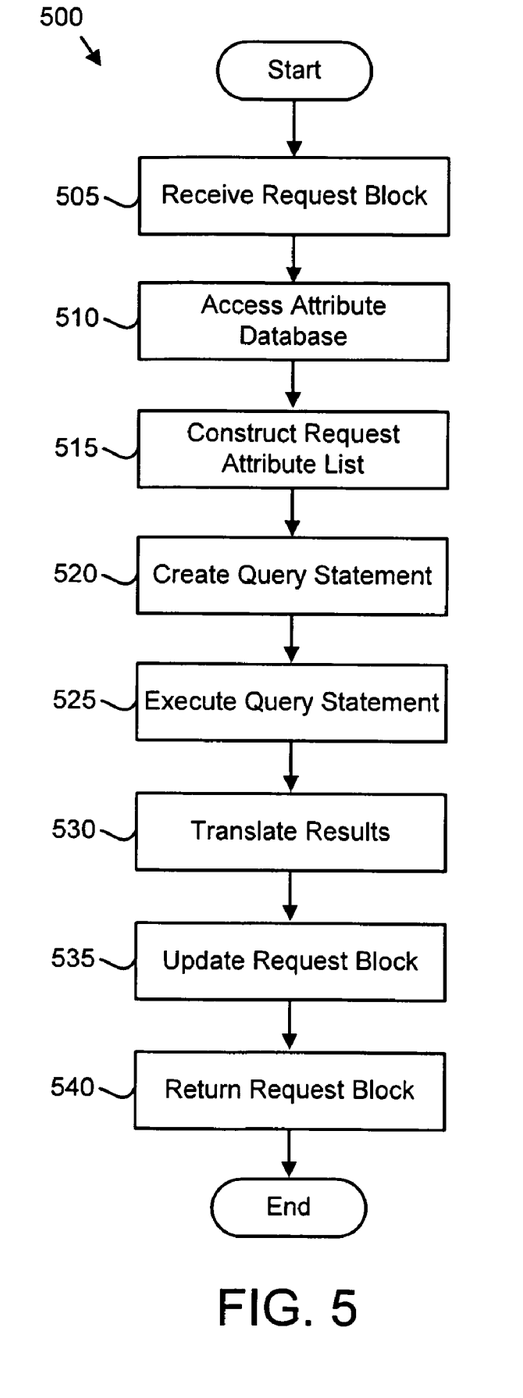
FIG. 5 is a schematic flow chart diagram illustrating one embodiment of a database access method of the present invention.

FIG. 5 is a schematic flow chart diagram illustrating one embodiment of a database access method 500 of the present invention. The method 500 substantially includes the steps to carry out the functions presented above with respect to the operation of the described system 100, process 300, and apparatus 200, 400 of FIGS. 1-4. In addition, the method 500 refers to elements of FIGS. 1-4, like numbers referring to like elements.

The method 500 begins and in one embodiment a request attribute module 205 receives 505 a request block 305a. In a certain embodiment, the request attribute module 205 receives 505 the request block 305a from a request module 135 through an interface module 140 and a common broker interface 130. The request block 305a is configured as an inquiry directed to a target database 105, but is not formatted as a query statement for the target database 105. In addition, the request block 305a includes one or more data value names and may include one or more key values for each data value name. The request block 305a may also include a format specification for a result returned in response to the inquiry.

In one embodiment, the request attribute module 205 accesses 510 an attribute database 110. The attribute database comprises one or more entries, each entry including a data value name, an attribute name, and at least one schema and/or table name. The request attribute module 205 constructs 515 a request attribute list 310 from an entry of the attribute database 110 corresponding to the data value name as will be described hereafter in FIG. 10. The request attribute list 310 includes the data value name, attribute name, and one or more schema and/or table names. In addition, the request attribute list 310 may include a database name.

The schema name module 210, attribute name module 215, and query build module 220 create 520 a query statement directed to the target database 105 as will be described hereafter in FIG. 6. In one embodiment, a query execution module 225 executes 525 the query statement as will be described hereafter in FIG. 7.

In one embodiment, the translation module 230 translates 530 results from the query statement to the format specified by the request block 305a. In addition, the translation module 230 may update 535 an appended request block 305b with the translated result of the query statement. For example, the translation module 230 may concatenate the translated result with the appended request block 305b of FIG. 3 to form the updated request block 305c. The translation module 230 may further return 540 the updated request block 305c such as to the request module 135. The method 500 accesses the target database 105 and returns 540 the results in response to a request block 305a that is not formatted as a query statement.

Figure 6:
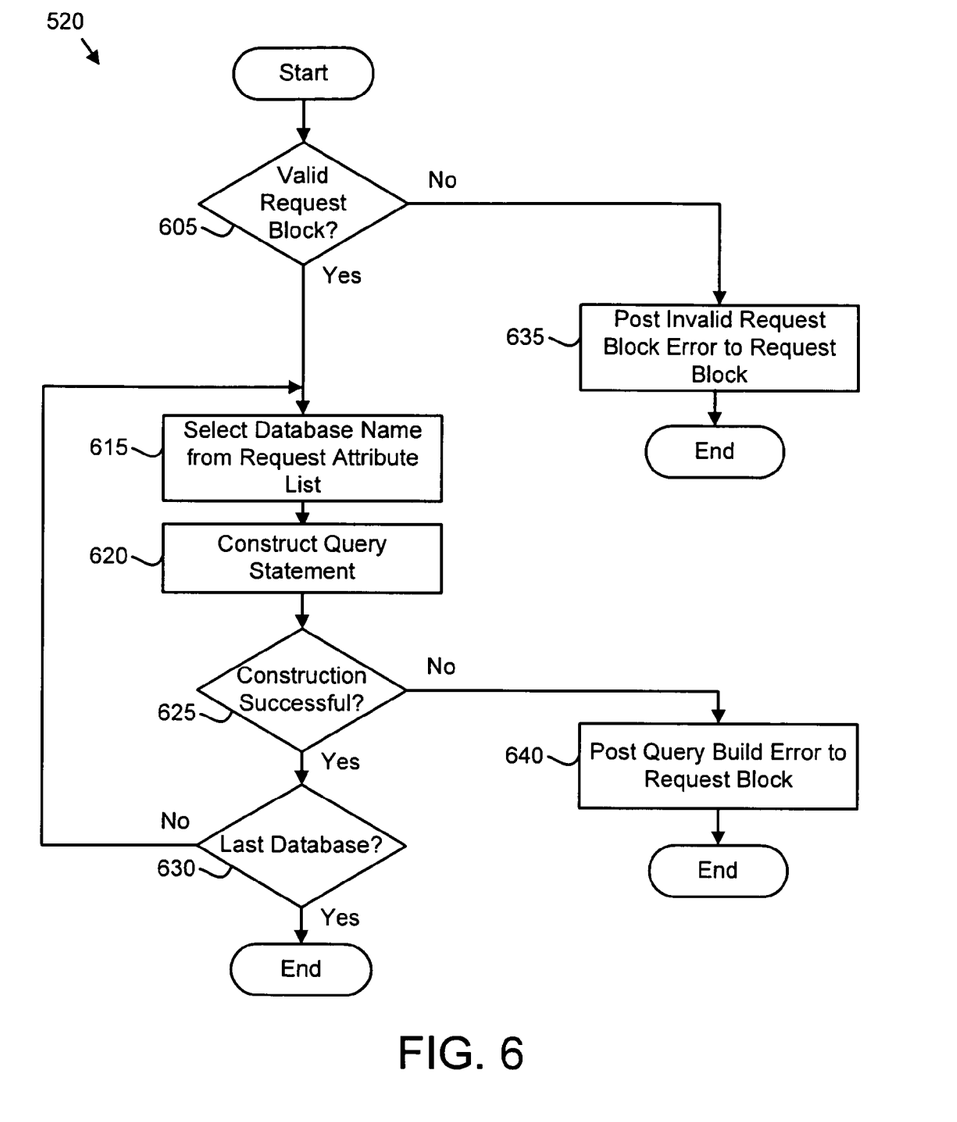
FIG. 6 is a schematic flow chart diagram illustrating one embodiment of a create query statement method of the present invention.

FIG. 6 is a schematic flow chart diagram illustrating one embodiment of a create query statement method 520 of the present invention. The method 520 substantially includes the steps to carry out the functions presented above with respect to the operation of step 520 of FIG. 5 and of the described system 100, process 300, and apparatus 200, 400 of FIGS. 1-4. In addition, the method 520 refers to elements of FIGS. 1-5, like numbers referring to like elements.

The method 520 begins and in one embodiment, the request attribute module 205 determines 605 if the request block 305a of step 505 of FIG. 5 is valid. The request attribute module 205 may determine 605 the request block 305a is valid by finding a data value name in the attribute database 110 that corresponds to the data value name included in the request block 305a. In addition, the request attribute module 205 may validate the request block 305a by checking the syntax and format of the request block 305a.

If the request attribute block 205 determines 605 the request block 305a is not valid, the request attribute block 205 may post 635 an invalid request block error to the request block 305a, return the request block 305a such as to the request module 135 of FIG. 1, and the method 520 terminates. The invalid request block error may detail why the request block 305a is invalid.

If the request attribute module 205 determines 605 the request block 305a is valid, the request attribute module 205 may select 615 a database name for a target database 105 from the request attribute list 310, and the schema name module 210, attribute name module 215 and query build module 220 construct 620 a query statement as will be described hereafter. The query build module 220 further determines 625 if the query statement construction is successful.

If the query build module 220 determines 625 the construction is not successful, the query build module 220 may post 640 a query build error to the request block 305a, return the request block 305a to the request module 135, and the method 520 terminates. If the construction is successful, the request attribute module 205 determines 630 if the last database name in the request attribute list 310 is accessed. If the last database name is not accessed, the request attribute module 205 selects 615 the next database name. If the last database name is accessed, the method 520 terminates.

Figure 7:
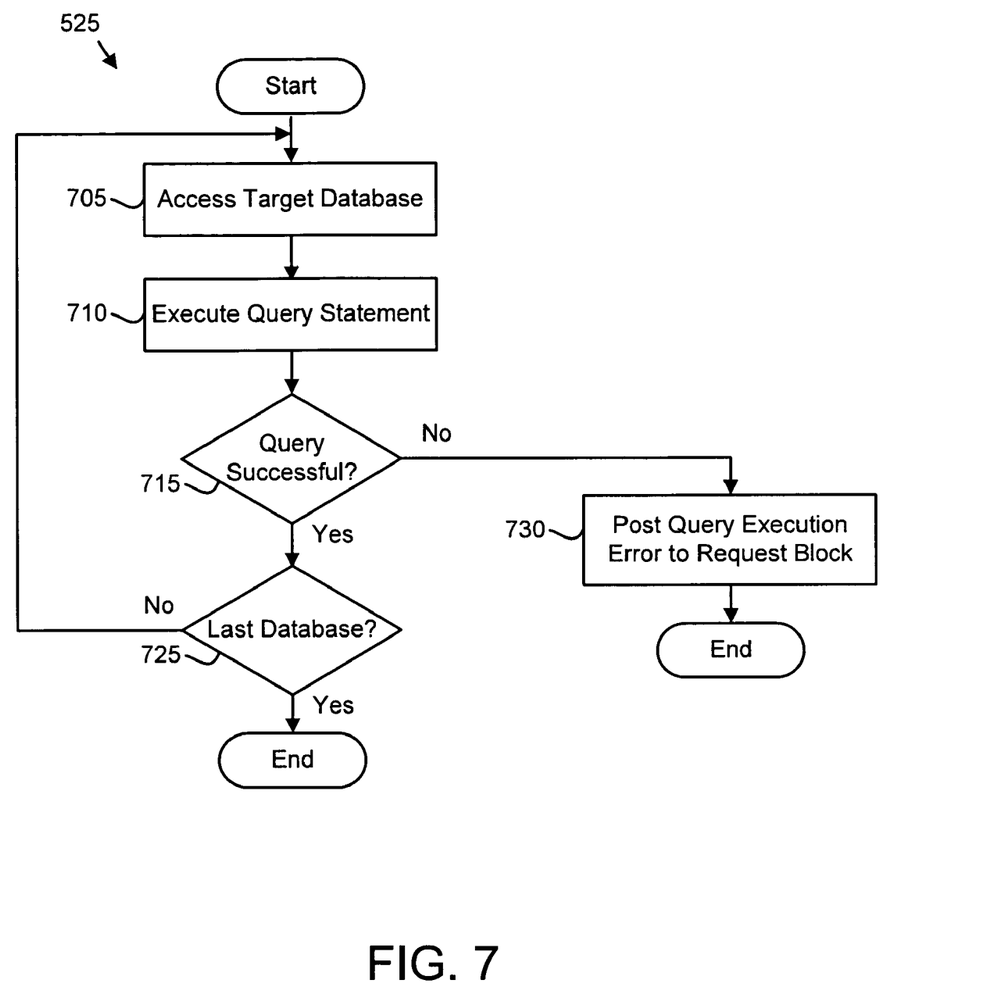
FIG. 7 is a schematic flow chart diagram illustrating one embodiment of an execute query statement method of the present invention.

FIG. 7 is a schematic flow chart diagram illustrating one embodiment of an execute query statement method 525 of the present invention. The method 525 substantially includes the steps necessary to carry out the functions presented above with respect to the operation of step 525 of FIG. 5 and of the described system 100, process 300, and apparatus 200, 400 of FIGS. 1-4. In addition, the method 525 refers to elements of FIGS. 1-6, like numbers referring to like elements.

The method 525 begins and a query execution module 220 may select 705 a target database 105 specified by the query statement created in step 520 of FIG. 5. In addition, the query execution module 220 may execute 710 the query statement. In one embodiment, the query execution module 220 executes 710 the query statement using a database application program such as the target database interface 115 of FIG. 1.

In one embodiment, the query execution module 220 determines 715 if the query execution is successful. The query execution module 220 may determine 715 the success of the query execution in response to a result from the query execution. For example, if the result is an error message, the query execution module 220 may determine 715 the query execution is unsuccessful. Similarly, if the result is data, the query execution module 220 may determine 715 the query execution is successful.

If the query execution module 220 determines 715 the query is not successful, the query execution module 220 may post 730 a query execution error to the request block 305a, return the request block 305a to a request module 135, and the method 525 terminates. If the query execution module 220 determines 715 the query is successful, the query execution module 220 determines 725 if the last database name from the query statement is accessed. If the last database name is not accessed, the query execution module 220 selects 705 the next target database 105 specified by the query statement. If the last database name is accessed, the method 525 terminates.

Figure 8:
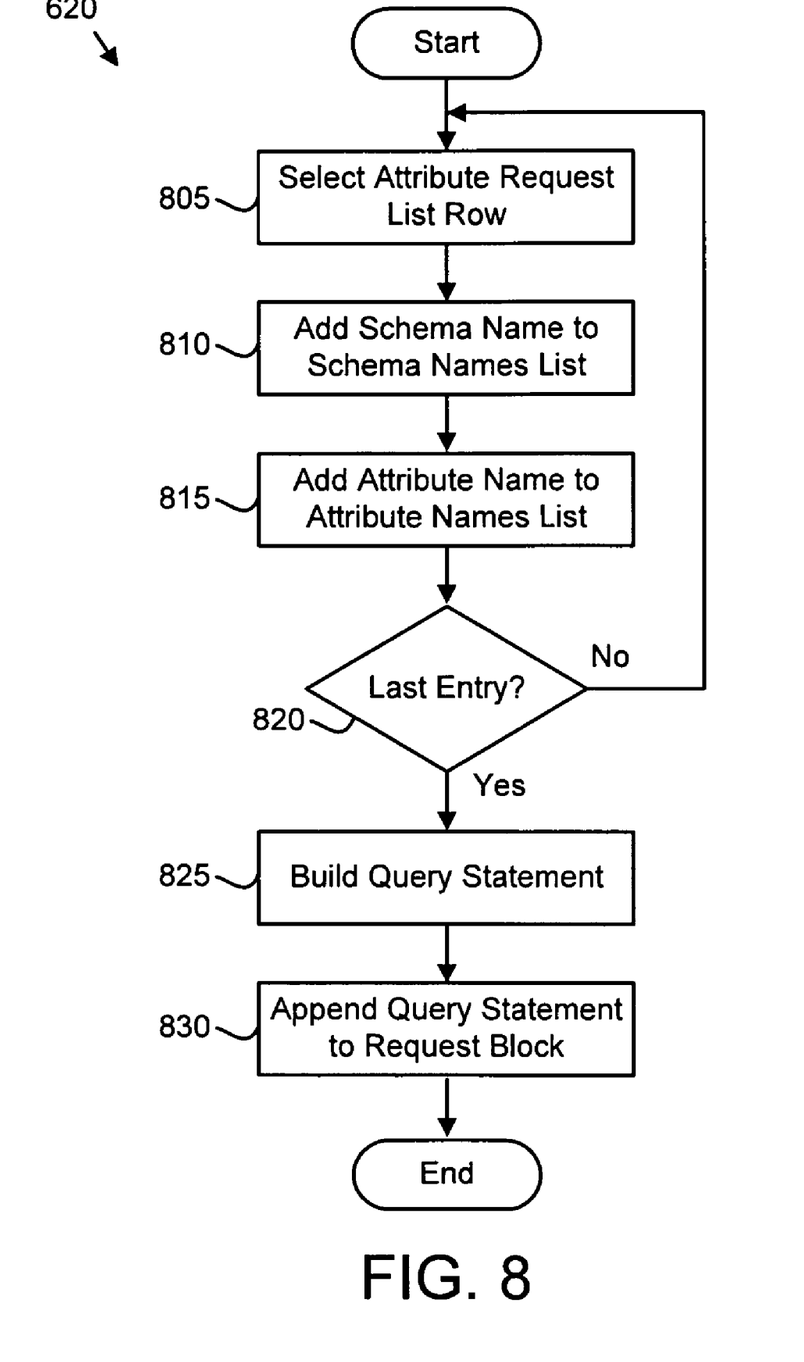
FIG. 8 is a schematic flow chart diagram illustrating one embodiment of a construct query statement method of the present invention.

FIG. 8 is a schematic flow chart diagram illustrating one embodiment of a construct query statement method 620 of the present invention. The method 620 substantially includes the steps to carry out the functions presented above with respect to the operation of step 620 of FIG. 6 and of the described system 100, process 300, and apparatus 200, 400 of FIGS. 1-4. In addition, the method 620 refers to elements of FIGS. 1-7, like numbers referring to like elements.

The method 620 begins and in one embodiment, a schema name module 210 selects 805 an entry of a request attribute list 310 such as the first entry. In addition the schema name module 210 adds 810 a schema and/or table name from the entry of the request attribute list 310 to a schema names list 315 if the schema name is not included on a schema names list 315. For example, if the schema name "customer" is not included on the schema names list 315, the schema name module 210 adds 810 the schema name "customer" to the schema names list 315.

The attribute name module 215 adds 815 an attribute name from the request attribute list entry if the attribute name is not on an attribute names list 320. For example, if the attribute "phone" is not on the attribute names list 320, the attribute name module 215 may add 815 the attribute name "phone" to the attribute names list 320.

The attribute name module 215 may determine 820 if the entry is the last entry of the request attribute list 310. If the entry is not the last entry, the schema name module 210 selects 805 a next entry of the request attribute list 310. If the entry is the last entry, the query build module 220 builds 825 a query statement from the schema names list 315 and the attribute names list 320.

In one embodiment, the query statement is an SQL statement. In a certain embodiment, the query statement is a SELECT statement. For example, the SELECT statement may be in the form "SELECT attribute_name_1, attribute_name_2 FROM schema_name;" where "attribute_name_1" and "attribute_name_2" are on the attribute names list 320 and "schema_name" is on the schema names list 315. In an alternate example, the SELECT statement may be in the form "SELECT attribute_name_1 FROM schema_name_1 where schema_name_2=key;" where "attribute_name_1 is on the attribute names list 320, "schema_name_1" and "schema_name_2" are on the schema names list 315, and "key" is a key value included in a request block 305a and added to the request attribute list 310. The "key" may specify a row in a column identified by "schema_name_2."

In one embodiment, query build module 220 appends 830 the query statement to the request block 305a to form an appended request block 305b and the method 620 terminates. The method 620 constructs the query statement for accessing a target database 105.

Figure 9:
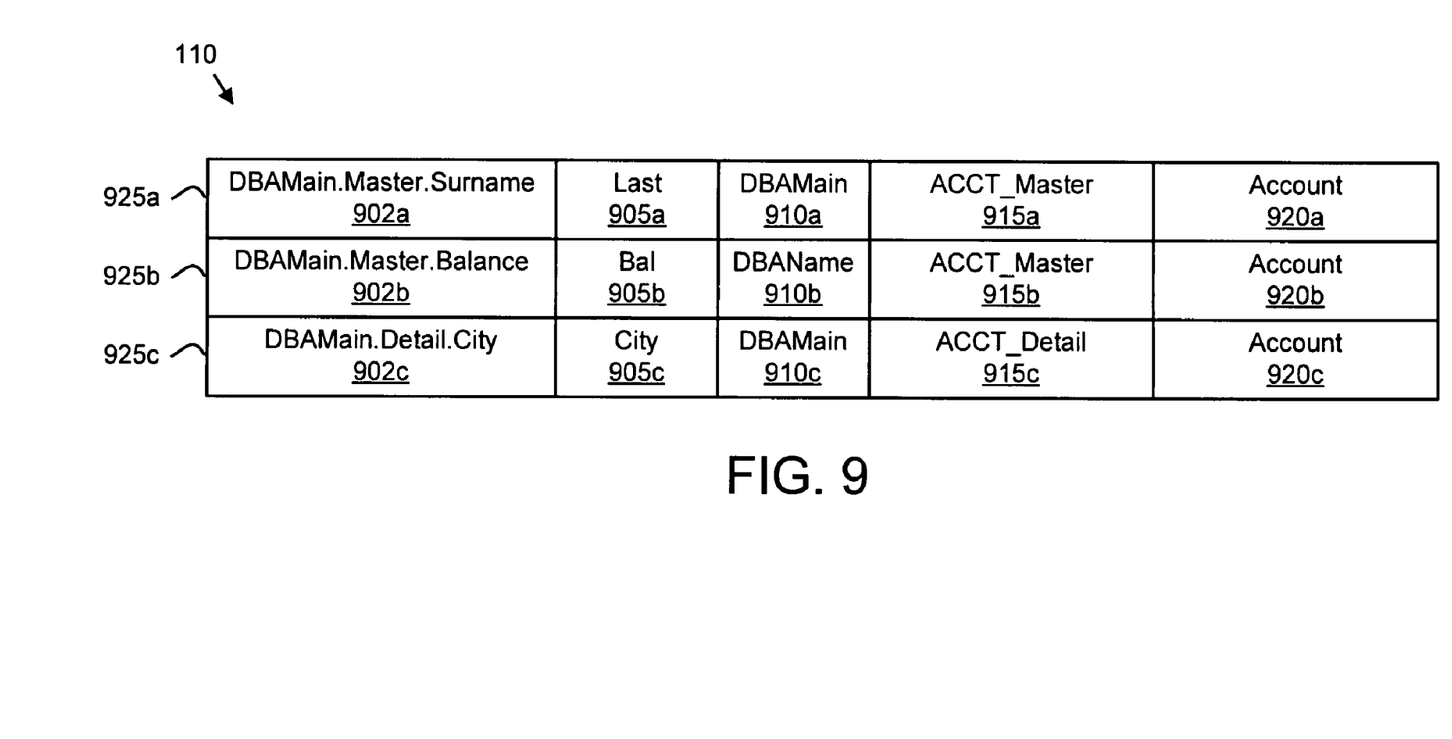
FIG. 9 is a schematic block diagram illustrating one embodiment of an attribute database format of the present invention.

FIG. 9 is a schematic block diagram illustrating one embodiment of an attribute database 110 of the present invention. The attribute database 110 may be the attribute database 110 of FIG. 1. In addition, the description of FIG. 9 refers to elements of FIGS. 1-8, like numbers referring to like elements.

The attribute database 110 includes one or more entries 925. Each entry 925 may include a data value name field 902, an attribute name field 905, a database name field 910, a first schema name field 915, and a second schema name field 920. In one embodiment, the first schema name field 915 stores a table name or a view name. The second schema name field 920 may store a key column name. The data value name field 902 may support lengthy, hierarchal names, even if the attribute name associated with the data value name is limited to a specified length or format such as eight ASCII characters. The request attribute module 220 may select an entry 925 from the attribute database 110 by matching a data value name from a request block 305 with a data value name in a data value name field 902.

Figure 10:
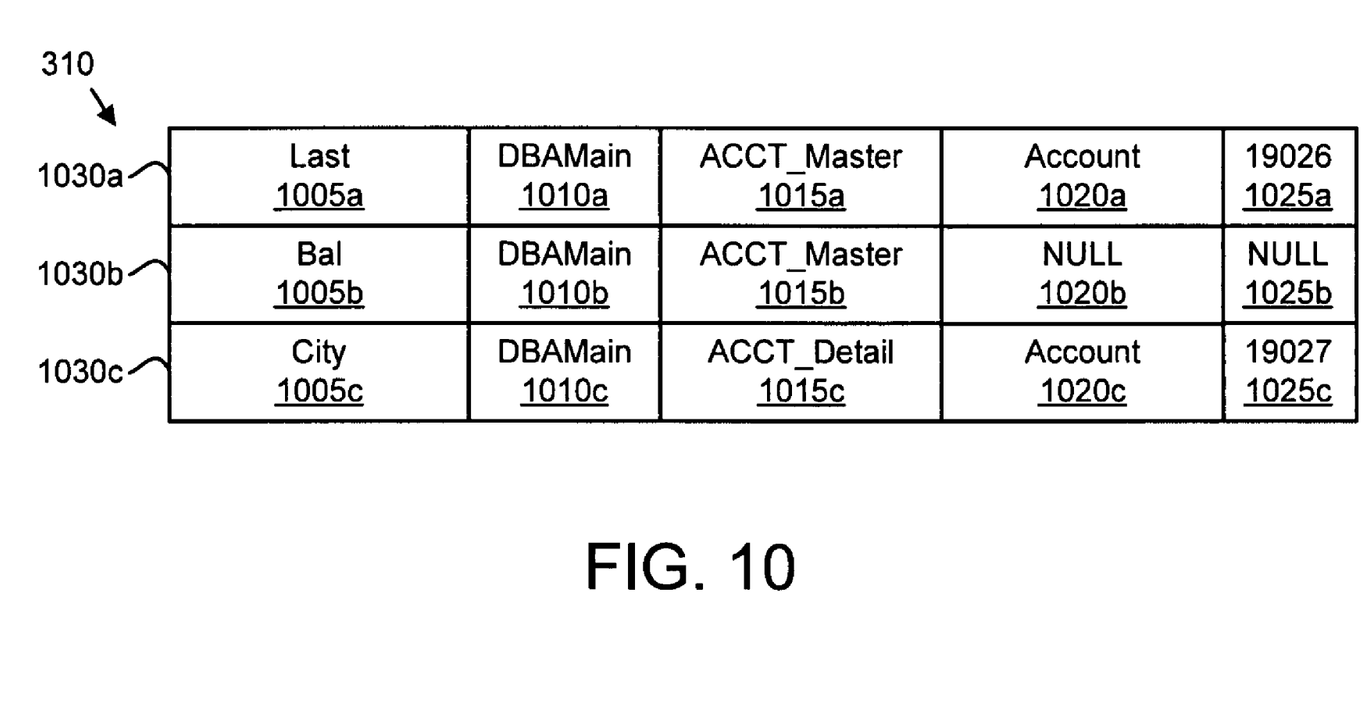
FIG. 10 is a schematic block diagram illustrating one embodiment of a request attribute list of the present invention.

FIG. 10 is a schematic block diagram illustrating one embodiment of a request attribute list 310 of the present invention. The list 310 may be the request attribute list 310 of FIG. 3. In addition, the description of FIG. 10 refers to elements of FIGS. 1-9, like numbers referring to like elements.

The list 310 includes one or more entries 1030. Each entry 1030 may comprise an attribute name field 1005, a database name field 1010, a first schema name field 1015, a key column field 1020, and a key field 1025. A request attribute module 220 may construct the request attribute list 310 from a selected entry 925 from the attribute database 110 of FIG. 9. In one embodiment, the request attribute module 220 copies an attribute name field 905, database name field 910, and a first schema name field 915 of a selected entry 925 from the attribute database 110 to the attribute field 1005, database name filed 1010, and first schema file 1015 of an entry 1030 of the request attribute list 310.

The request attribute module 220 may also append a key from a request block 305a to the key field 1025 of the request attribute list 310. In a certain embodiment, the request attribute module 220 copies the second schema field 920 of the attribute database 110 to the key column 1020 if there is a key value in the key field 1025. The first entry 1025a is depicted with a key 1020a of "19026." The query build module 220 may build 825 the SQL statement "SELECT Last FROM ACCT_Master WHERE account=19026;" from the first entry 1025a of the request attribute list 310.

If the request block 305a does not include a key, the request attribute module 220 may insert NULL values for the key 1020 and the key column 1015, such as is depicted for a second key 1020b and key column 1015b. The query build module 220 may build 825 the SQL statement "SELECT Bal FROM ACCT_Master;" from the second entry 1025b of the request attribute list 310.

The embodiment of the present invention accesses a target database 105 in response to a request block 305a that is not formatted as a database query statement. In addition, the embodiment of the present invention allows a plurality of non-database software request modules 135 to access the target database 105. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to access a database, the apparatus comprising:
    a plurality of interface modules comprising executable code stored on a storage device and executed by a processor, a first interface module receiving an inquiry from a first request module of a plurality of request modules, the plurality of request modules comprising executable code stored on the storage device and executed on the processor, each request module unable to form a database query for a target database and comprising one unique type of executable code including at least C++ code and Extensible Markup Language (XML) code, the first interface module converting the inquiry into a common inquiry format;
    a common broker interface comprising executable code stored on the storage device and executed by the processor, the common interface broker converting the common inquiry format to a request block, wherein the request block is not formatted as a query statement for the target database and comprises a format specification for a result returned in response to the inquiry and a linked data array of requests organized as delimited character strings, a delimited character string comprising the data value name, and a key value;
    a request attribute module comprising executable code stored on the storage device, executed by the processor, and configured to construct a request attribute list for the data value name received in the request block from the wherein the request attribute list associates the data value name with an attribute name and with a schema name;
    a schema name module comprising executable code stored on the storage device, executed by the processor, and configured to add the schema name from the request attribute list to a schema names list in response to the schema name not being included in the schema names list;
    an attribute name module comprising executable code stored on the storage device, executed by the processor, and configured to add the attribute name from the request attribute list to an attribute names list in response to the attribute name not being included in the attribute names list;
    a query build module comprising executable code stored on the storage device, executed by the processor, and configured to build a query statement directed to the target database from the schema names list and the attribute names list; and
    a translation module comprising executable code stored on the storage device, executed by the processor, and configured to translate a result from executing the query statement to the format specification specified for the result and update the request block with the translated result of the query statement and return the updated request block to the first request module.

2. The apparatus of claim 1, wherein the request attribute module is further configured to construct the request attribute list using an attribute database, wherein the attribute database associates the data value name with the attribute name and the schema name.

3. The apparatus of claim 2, wherein the attribute database is further configured to associate a plurality of schema names with the attribute name.

4. The apparatus of claim 1, further comprising a query execution module comprising executable code stored on the storage device, executed by the processor, and configured to execute the query statement.

5. The apparatus of claim 1, wherein the query statement is configured as a structured query language ("SQL") statement.

6. The apparatus of claim 5, wherein the SQL statement further comprises a work flow print command.

7. A storage device having thereon a program of executable code, the program of executable code executed by a processor to perform an operation to access a database, the operation comprising:
    receiving an inquiry from a first request module of a plurality of request modules, the plurality of request modules, each request module unable to form a database query for a target database and comprising one unique type of executable code including at least C++ code and Extensible Markup Language (XML) code;
    converting the inquiry into a common inquiry format;
    converting the common inquiry format to a request block, wherein the request block is not formatted as a query statement for the target database and comprises a format specification for a result returned in response to the inquiry and a linked data array of requests organized as delimited character strings, a delimited character string comprising the data value name and a key value;
    constructing a request attribute list from an attribute database for the data value name received in the request block, wherein the request attribute list associates the data value name with an attribute name and a schema name;
    adding the schema name from the request attribute list to a schema names list in response to the schema name not being included in the schema names list;
    adding the attribute name to the request attribute list in response to the attribute name not being included in the attribute names list;
    building a query statement directed to the target database from the schema names list and the attribute names list;
    translating a result from executing the query statement to the format specification specified for the result;
    updating the request block with the translated result of the query statement; and
    returning the updated request block to the first request module.

8. The storage device of claim 7, wherein the program of executable code further comprise an operation to execute the query statement.

9. The storage device of claim 7, further comprising an operation to add a key to the schema names list in response to the key not being included in the schema names list.

10. The storage device of claim 7, wherein the query statement is configured as an SQL statement.

11. The storage device of claim 10, wherein the query SQL statement further comprises a work flow print command.

12. The storage device of claim 7, wherein the schema name is selected from a database name, a table name, and a view name.

13. The storage device of claim 7, wherein the attribute database is further configured to associate a plurality of schema names with the attribute name.

14. A system to access a database, the system comprising:
a target database configured to store data on a storage device with an organization defined by a schema;
an attribute database comprising executable code stored on the storage device, executed by a processor, and configured to associate a data value name with an attribute name and a schema name for the target database;
a plurality of request modules comprising executable code stored on the storage device and executed on the processor, each request module unable to form a database query for the target database and comprising one unique type of executable code including at least C++ code and XML code;
a plurality of interface modules comprising executable code stored on the storage device and executed by the processor, a first interface module receiving an inquiry from a first request module of the plurality of request modules and converting the inquiry into a common inquiry format;
a common broker interface comprising executable code stored on the storage device and executed by the processor, the common interface broker converting the common inquiry format to a request block, wherein the request block is not formatted as a query statement for the target database and comprises a format specification for a result returned in response to the inquiry and a linked data array of requests organized as delimited character strings, a delimited character string comprising the data value name and a key value;
a request attribute module comprising executable code stored on the storage device, executed by the processor, and configured to construct a request attribute list from the attribute database for the data value name, wherein the data value name is received in the request block the request attribute list associates the data value name with the attribute name with the schema name;
a schema name module comprising executable code stored on the storage device, executed by the processor, and configured to add the schema name from the request attribute list to a schema names list in response to the schema name not being included in the schema names list;
an attribute name module comprising executable code stored on the storage device, executed by the processor, and configured to add the attribute name from the request attribute list to an attribute names list in response to the attribute name not being included in the attribute names list;
a query build module comprising executable code stored on the storage device, executed by the processor, and configured to build a query statement directed to the target database from the schema names list and the attribute names list;
a query execution module comprising executable code stored on the storage device, executed by the processor, and configured to execute the query statement; and
a translation module comprising executable code stored on the storage device, executed by the processor, and configured to translate a result from executing the query statement to the format specification specified for the result and update the request block with the translated result of the query statement and return the updated request block to the first request module.

15. The system of claim 14, wherein the query statement is configured as an SQL statement.

16. The system of claim 15, wherein the SQL statement further comprises a work flow print command.

17. A method performed by executable code stored on a storage device, executed by a processor, and comprising:
receiving an inquiry from a first request module of a plurality of request modules, the plurality of request modules comprising executable code stored on the storage device and executed on the processor, each request module unable to form a database query for a target database and comprising one unique type of executable code including at least C++ code and XML code;
converting the inquiry into a common inquiry format;
converting the common inquiry format to a request block, wherein the request block is not formatted as a query statement for the target database and comprises a format specification for a result returned in response to the inquiry and a linked data array of requests organized as delimited character strings, a delimited character string comprising the data value name and a key value;
constructing a request attribute list for the data value name from an attribute database, wherein the attribute database associates the data value name with an attribute name and a schema name and the request attribute list associates the data value name with the attribute name and the schema name;
adding the schema name from the request attribute list to a schema names list in response to the schema name not being included in the schema names list;
adding the attribute name from the request attribute list to an attribute names list in response to the attribute name not being included in the attribute names list;
building a query statement from the schema names list and the attribute names list;
executing the query statement;
translating a result from executing the query statement to the format specification specified for the result;
updating the request block with the translated result of the query statement; and
returning the updated request block with the translated results of the query statement to the first request module.

18. The method of claim 17, wherein the query statement is configured as an SQL statement.

19. The method of claim 18, wherein the query SQL statement further comprises a work flow print command.

* * * * *